P. MATHIS.
WATER HEATING ATTACHMENT FOR FLUES.
APPLICATION FILED MAR. 28, 1918.
1,311,702.
Patented July 29, 1919.
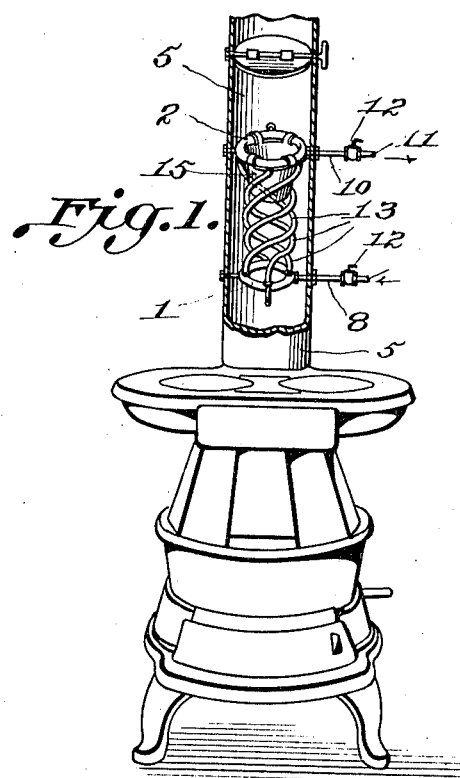
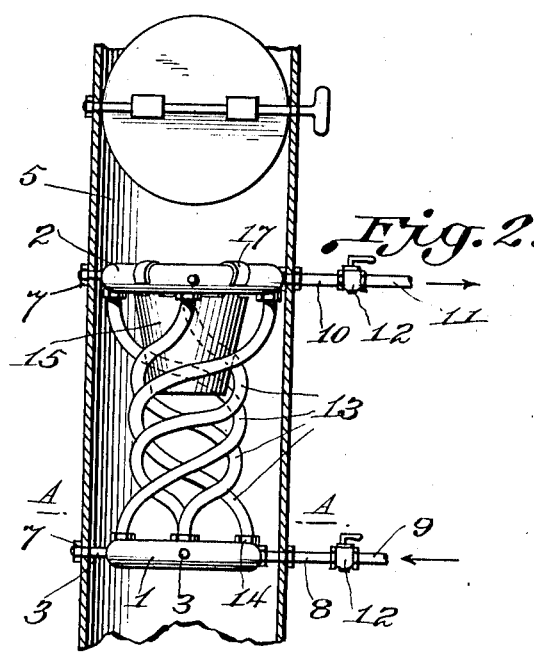
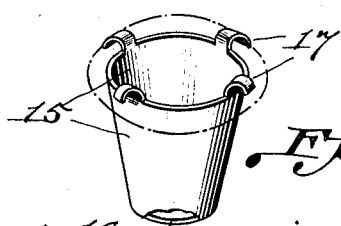
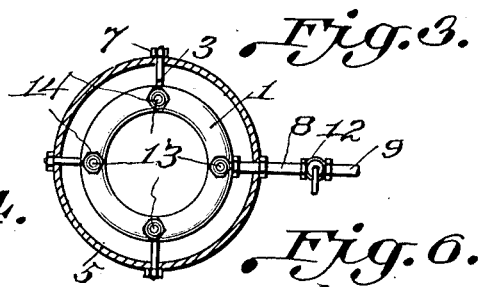
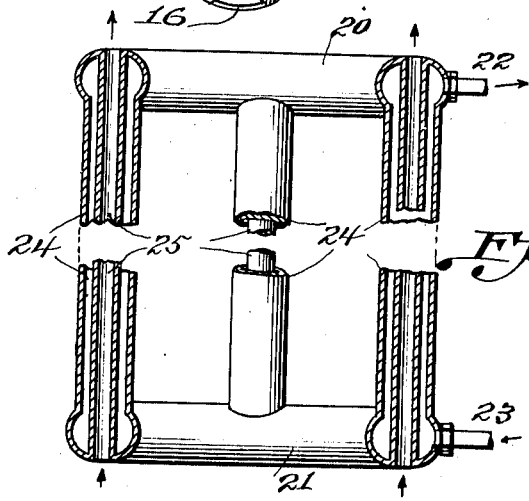
Inventor,
Paul Mathis
Atty.

UNITED STATES PATENT OFFICE.

PAUL MATHIS, OF BROOKLYN, NEW YORK.

WATER-HEATING ATTACHMENT FOR FLUES.

1,311,702.  Specification of Letters Patent.  Patented July 29, 1919.

Application filed March 28, 1918. Serial No. 225,302.

*To all whom it may concern:*

Be it known that I, PAUL MATHIS, a citizen of the United States, residing at Brooklyn, in the county of Kings and State of New York, have invented certain new and useful Improvements in Water-Heating Attachments for Flues, of which the following is a specification.

This invention relates to domestic water heaters, and pertains especially to the class of water heaters applicable to flues or smoke pipes of cooking ranges, stoves and furnaces.

The object of the invention is to provide a water circulating device of novel and peculiar construction which shall be applicable to and suspended within an ordinary flue, steam exhaust or smoke pipe, whereby the usual waste heat from combustion and discharge through such tubes or pipes may be utilized for heating water contained in and circulated by said device.

A further object of the invention is to provide a water circulating device of such novel and peculiar construction and arrangement of parts as to be inserted into and removed from an exhaust flue or smoke pipe, and as to be attached to and suspended by the flue or pipe so as to permit combustion discharge and free circulation laterally and vertically throughout the device and between the latter and the flue or pipe.

A still further object of the invention is to provide a water circulating attachment suspendable within an exhaust flue, smoke pipe or other heat discharge pipe or chamber, and having a water intake ring and a water discharge ring connected by a plurality of water pipes, and to furnish the discharge ring with a baffle for deflecting heat products between said pipes and rings.

Various other objects, advantages and improved results are attainable in the practical application of the invention as hereinafter described.

In the accompanying drawings forming part of this application:

Figure 1 is a perspective view, partly broken away, illustrating the application of the invention to a laundry stove.

Fig. 2 is a sectional view of part of a flue or smoke pipe showing the device suspended therein.

Fig. 3 is a sectional view taken on the dotted line A—A, Fig. 2.

Fig. 4 is a detail perspective view of the baffle.

Fig. 5 is a sectional elevation showing a modification.

Fig. 6 is a detail view of a further modification.

The same reference characters denote the same parts throughout the several views of the drawings.

In carrying out my invention I employ a pair of rings, one of which will be referred to as the bottom or water intake ring 1, and the other as the top or water discharge ring 2, which is of larger diameter than the bottom ring and which overhangs a passage between the flue and the bottom ring. These rings may be made in any suitable or convenient way, but I preferably cast the rings and provide them with arms 3 adapted to fit within a flue or pipe 5 and be secured thereto by nuts 7, or set-screws may be used instead of the bolts and nuts. The intake ring is provided with a stem 8 to which is coupled a cold water supply pipe 9, and the discharge ring has a similar stem 10 for a hot water pipe 11 which may be connected to a hot water tank or faucet. The stems 8 and 10 project through the apertures in the pipe 5 for making said pipe connections, and the stems may be provided with suitable stopcocks 12.

The water circulating rings are connected by a plurality of water tubes 13, preferably zigzag or serpentine shape, vertically from one ring to the other, for the purpose and advantage of deriving all heat possible from the fumes, smoke or other heated exhaust passing through or into the pipe 5. The tubes are preferably so bent or shaped and assembled as to leave openings or spaces between them for diffusion of the heat products and to avoid accumulation of combustion products. The bottom ring is of less diameter than the top ring so as to leave a greater annular flue space between it and the pipe 5 than is left by the top ring for the purpose of permitting free passage of the fumes to the tubes 13 and the top ring. The tubes 13 may be attached to the rings by water-tight joints in the usual way, and for this purpose the rings may have screw nipples 14 cast thereon for connecting the tubes.

In order to retard the passage of fumes through the pipe 5 and to deflect the same under the top ring so as to diffuse the fumes or smoke for heating the rings and the tubes, I provide a baffle device comprising an inverted truncated cone shaped shell 15 having a bottom closure plate 16, and ears 17 at the top thereof for hooking over the top ring so as to permit the baffle to hang centrally from the top ring and be surrounded by the upper ends of the tubes 13.

Obviously, a section of the pipe 5 may be prepared for attaching the device, the latter inserted endwise therein and the ring couplings connected so as to project outside of the said pipe for coupling the hot and cold water pipes. Said attachments and connections affording expansion and contraction of the parts under varying heat conditions, and the same also affording means for expeditiously placing, adjusting and removing the device.

It will be seen that this device does not choke or interfere with the draft of the flue or pipe, but, owing to the space between the device and the flue, the open rings, the spaces between the serpentine tubes, and the bottom ring being smaller or of less diameter than the top ring, the draft is increased while the fumes or combustion products are centralized and circulated and deflected for heating the water contained and circulated through the rings and the tubes.

Referring to the modification shown in Fig. 5, this device is adaptable for larger apparatus or furnaces, and comprises top and bottom water circulating rings 20 and 21, respectively, having hot and cold water couplings 22 and 23, respectively. Said rings are connected by vertical water tubes 24 having central draft or heat fume tubes 25, so that both the inner and the outer surfaces of the water tubes are exposed to the fumes, and the water contained in or circulated by the tubes may have increased application of the exhaust combustion or fumes.

Referring to the modification shown in Fig. 6, the rings as 26ª, are suspended in and connected with a pipe or flue by arms as 27 having a slot 28, and the rings may be adjusted laterally on the arms by a bolt or thumb screw 29.

It will be understood that the illustration of the application of the invention in the drawings is only one of many practical uses which may be made of this device for heating and circulating water by waste heat or products of combustion from various heating apparatus or sources. Therefore, I do not limit myself to the application of the device, nor do I wish to be understood as confining myself to any particular size, material, length of tubes or location of the rings with respect to each other, but reserve the right to make such changes and variations in the manufacture and application of the invention as may come within the scope of the appended claims.

Having thus described my invention, what I claim as new and desire to secure by Letters Patent is:

1. The combination with a flue, of a water circulating and heating appliance comprising a bottom ring suspended in the flue so as to leave a flue space below the ring and affording an annular passage between the ring and the flue, a top ring suspended in the flue and affording a passage between this ring and the flue smaller than the other passage, said top ring overhanging said annular passage so as to deflect currents between the rings, a plurality of water pipes connecting the rings, and means for suspending the rings.

2. A water heating appliance for exhaust flues of heating apparatus, comprising a pair of water circulating rings, a plurality of water tubes connecting the rings, a baffle having projections for hanging the baffle on one of the rings centrally between the tubes, means for suspending the rings central of a flue, and water supply pipes extending through the flue and connected respectively with the rings.

3. A water heating appliance of the character described, comprising a pair of water circulating rings spaced apart, one of said rings being of less diameter than the other, securing means projecting from the rings, a plurality of tubes connecting the rings for conveying the water from the smaller to the larger tube, and means for connecting water pipes with the rings.

4. A water heating appliance of the character described, comprising a pair of water circulating rings of unequal diameter, a plurality of serpentine water tubes connecting the rings, means for suspending the larger ring above the smaller ring, and means for connecting the respective rings with water supply and discharge pipes.

5. A water circulating and heating appliance for exhaust flues, comprising a water intake ring, a water discharge ring above and of greater diameter than the intake ring, means for attaching the rings within a flue, an inverted truncated cone shaped baffle, hooks projecting from the top of the baffle and engaging one of the rings for hanging the baffle central of the rings, and a plurality of water circulating pipes connecting the rings.

In witness whereof I hereunto set my hand in the presence of two witnesses.

PAUL MATHIS.

Witnesses:
F. A. STORY,
DELMAS GUERNO.